April 15, 1969 G. J. BUFF, JR 3,438,543
CONTAINER-EDGE CONSTRUCTION
Filed Jan. 29, 1968

INVENTOR.
GEORGE J. BUFF, JR.
BY Robertson and Youtie
ATTORNEYS.

United States Patent Office 3,438,543
Patented Apr. 15, 1969

3,438,543
CONTAINER-EDGE CONSTRUCTION
George J. Buff, Jr., c/o Penny Plate, Inc., Kresson Road and New Jersey Turnpike, Cherry Hill, N.J. 08034
Filed Jan. 29, 1968, Ser. No. 701,437
Int. Cl. B65d 7/44, 5/26; A47j 43/18
U.S. Cl. 220—74                     4 Claims

ABSTRACT OF THE DISCLOSURE

This invention is essentially concerned with a container formed of metal foil or the like wherein a side wall is provided with a pair of upper and lower outstanding beads which serve to effectively strengthen and reinforce the side wall, as well as to define a receiver or groove for a removable container lid.

BACKGROUND OF THE INVENTION

While this invention is illustrated and described herein with particular reference to a pie pan, and has been commercially developed primarily for such use, it is understood that the advantageous features hereof may be applied with equal advantage to a wide variety of other types of containers, all of which are intended to be comprehended herein.

As is well known to those versed in the art, the provision of readily removable and replaceable lids on pie pans has presented considerable problem to packaging engineers and the like. The problems concern providing means for retention of the lid on the container during handling and storage, all without damage to the pie or other contents, as well as to afford means for removal and replacement of the lid in an originally sealed or relatively airtight condition for preservation of the pie.

While there have, in the past, been numerous proposals for pie-pan constructions having removable lids or covers, these have not found general acceptance as not meeting the above-stated desiderata. Further compounding the problems are the provision of such a coverable pie-pan construction utilizing relatively inexpensive materials, such as metal foil.

SUMMARY

Accordingly, it is an important object of the present invention to provide a container construction, as for pies or otherwise, which overcomes the above-mentioned defects, is capable of being integrally fabricated from relatively inexpensive sheet material, such as aluminum foil, or the like, and wherein a relatively inexpensive cover or lid, such as are presently formed of plastic, or otherwise, may be quickly, easily and efficiently applied to and removed from the instant container and this procedure repeated indefinitely, maintaining an effective airtight seal when in closed position, for enhanced protection and elongated preservation of the contents.

It is a further object of the present invention to provide a container construction having the advantageous characteristics mentioned in the preceding paragraphs, wherein the container is greatly reinforced and rigidified so as to resist damage to the container and its contents by necessary handling in storage and shipment.

It is a more particular object of the present invention to provide a unique edge construction for a container wherein an externally grooved configuration is adapted for detachable interengagement with a lid, while serving to strengthen the container and protecting the contents, particularly by its upstanding relation about the piecrust edge.

It is still another object of the present invention to provide a container construction of the type described which enables the users thereof to effect considerable savings in time and effort required to open the container, partially remove its contents, and replace the container cover.

Other objects of the present invention will become apparent upon reading the following specification and referring to the accompanying drawings, which form a material part of this disclosure.

The invention accordingly consists in the features of construction, combinations of elements, and arrangements of parts, which will be exemplified in the construction hereinafter described, and of which the scope will be indicated by the appended claims.

DESCRIPTION OF THE PREFERRED EMBODIMENT

Figure 1:
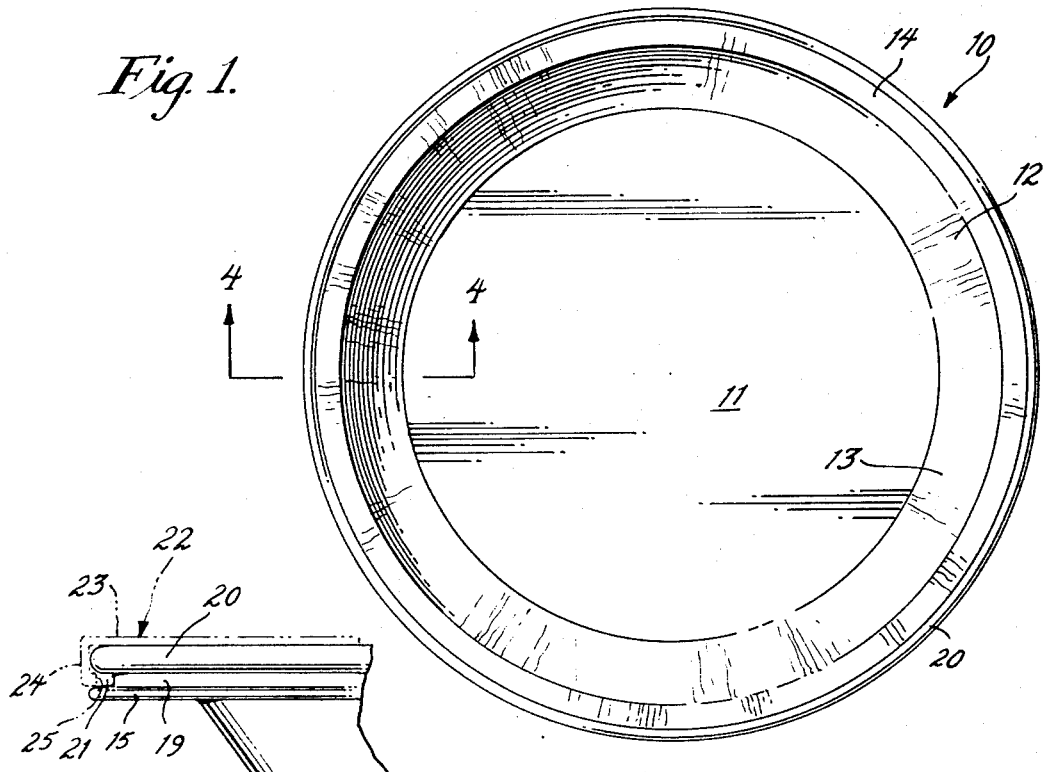
FIGURE 1 is a top plan view showing a container constructed in accordance with the teachings of the present invention.

Referring now more particularly to the drawing, a container of the present invention is there generally designated 10 and may advantageously be integrally formed from a single sheet of suitable material, such as aluminum foil, or other. In a practical embodiment it has been found advantageous to employ aluminum foil of a thickness of .006 inch, foil thickness in the range between .004 and .010 inch being satisfactory.

The container 10 is illustrated as generally round, as for containing a conventional pie, but may be of other suitable configuration, square, rectangular, or any desired configuration, and may be of any desired size.

In the illustrated embodiment, the container 10 is formed centrally with a generally round, substantially flat bottom 11. Extending integrally from the bottom 11, peripherally thereabout, is a container side 12. While the container bottom 11 is illustrated as perfectly flat, it may be embossed or perforate, if desired, say to enhance esthetic appeal or cooking qualities.

The container side 12, in the instant embodiment, includes a lower side portion 13 which may upstand obliquely from the container bottom 11, extending circumferentially thereabout. The container side 12 may also include an upper portion 14 extending circumferentially about and generally radially outward from the upper edge of the lower side portion 13. This side construction is best seen in the cross-sectional view of FIGURE 4, the lower portion 13 being generally oblique to the horizontal, and the upper region 14 being generally horizontal for supporting the marginal region of a piecrust.

As thus far described, the container 10 may be substantially conventional.

Figure 4:
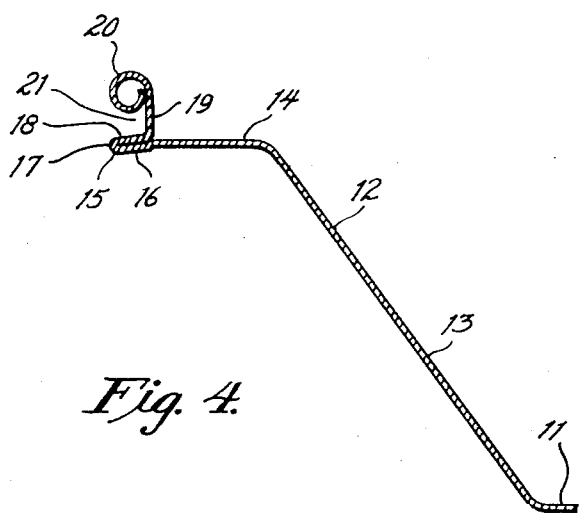
FIGURE 4 is an enlarged partial sectional elevational view taken generally along the line 4—4 of FIGURE 1.

Outstanding from the outer edge of the upper side portion 14, and extending circumferentially thereabout is a lower bead 15. The lower bead 15, as best seen in FIGURE 4, includes a lower section 16 extending peripherally about and outward from the outer edge of the upper side portion 14, and may be depressed slightly below the plane of the upper side portion. From the radially outer extremity of the lower section 16, the material thereof extends integrally in the form of a generally U-shaped bend or bight portion 17, which bend portion is bent upwardly and inwardly, and merges integrally with an upper portion 18 overlying the lower section 16. The upper portion 18 extends inwardly toward and terminates proximate to the outer edge of the upper side portion 14.

Upstanding integrally from the inner edge of the upper section 18 of lower bead 15, at the outer edge of the upper side portion 14, is a circumferential wall or fence 19. An upper circumferential bead 20 extends along the upper edge of wall or fence 19, projecting outward therefrom in spaced relation over the lower head 15. More specifically, the upper bead 20 is defined by an integral extension from the upper edge of the fence 19 which is curved outwardly, downwardly, inwardly and upwardly to define a curled upper bead 20 spaced over the lower bead 15.

It will now be appreciated that the lower and upper beads 15 and 20, respectively, being spaced vertically by the fence 19 and all extending circumferentially about the upper edge of the container side 12, serve to provide an outwardly facing channel or groove 21 which greatly enhances the rigidity and strength of the container side and entire container. By this reinforcing effect, the filled containers 10 may be economically handled in the conventional manner, resting on parallel spaced rods, without danger of damage.

Figure 2:
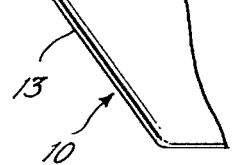
FIGURE 2 is a partial elevational view of the container of FIGURE 1, showing in phantom a container cover or lid in association with the container.
Figure 3:
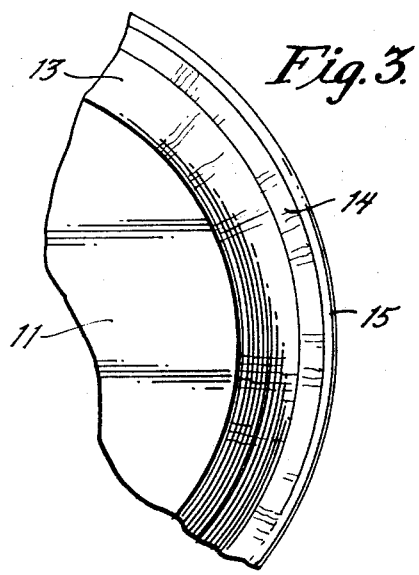
FIGURE 3 is a partial bottom plan view of the container of FIGURE 1.

Further, the outwardly facing channel or groove 21 serves to releasably retain the lip of a cover or lid, such as seen in FIGURE 2. In particular, a cover or lid 22 is shown in position over the container 10, including a generally circular top wall 23 and a peripherally extending depending side wall or skirt 24 just outward of the bead construction 15, 20. The lid skirt 24 may be provided with an internal lip 25 resiliently engageable in the groove 21 to releasably retain the lid 22 in position on the container 10. Such lid may be of the conventional polyethylene type, or other suitable type, as desired, and may be of other configuration, say for engagement beneath the lower bead 15, if desired. Obviously, the lid 22 may be readily removable and replaceable, which operation may be indefinitely repeated, without damage to the container 10 or lid. Also, the contents of the container are effectively protected, the lid affording a substantially airtight cover for the container, and the upstanding channel construction 15, 19 and 20 providing a protective wall for the marginal region of the contained pie, as well as retaining the lid spaced over the pie.

From the foregoing, it is seen that the present invention provides a container construction which fully accomplishes its intended objects and is well adapted to meet practical conditions of manufacture and use.

Although the present invention has been described in some detail by way of illustration and example for purposes of clarity of understanding, it is understood that certain changes and modifications may be made within the spirit of the invention.

What is claimed is:

1. A container fabricated from an integral sheet of metal foil and comprising a bottom, a side wall extending generally upwardly and outwardly from said bottom, said side wall including a lower portion extending upwardly from said bottom, and an upper portion extending generally radially outwardly from the upper edge of said lower portion, a first bead extending along and projecting generally radially outwardly from said upper side wall portion, a fence extending along and upstanding from said side wall upper portion inwardly of said first bead, and a second bead extending along and projecting outwardly from the upper edge of said fence over said first bead, whereby said first and second beads combine to greatly enhance the structural strength of said side wall and form an outwardly opening groove for removably receiving a lid.

2. A container according to claim 1, said first bead comprising a lower section extending generally radially outwardly from said upper side wall portion, a U-shaped bend portion extending from the outer edge of said lower section upwardly and inwardly, and an upper section extending inwardly from said bend portion over said lower section.

3. A container fabricated from an integral sheet of metal foil and comprising a bottom, a side wall extending generally upwardly and outwardly from said bottom, said side wall including a lower portion extending upwardly from said bottom, and an upper portion extending generally radially outwardly from the top edge of said lower portion, a first bead extending along and projecting generally radially outwardly from said upper side wall portion, a fence extending along and upstanding from said side wall upper portion inwardly of said first bead, and a second bead extending along and projecting outwardly from said fence over said first bead, said first bead comprising a lower section extending generally radially outwardly from said upper side wall portion, a U-shaped bend portion extending from the outer edge of said lower section upwardly and inwardly, and an upper section extending inwardly from said bend portion over said lower section, and said second bead comprising an extension from the upper edge of said fence curving outwardly, downwardly and inwardly to define a curl on the outer side of said fence, said first and second beads combining to greatly enhance the structural strength of said side wall and form an outwardly opening groove for receiving a removable lid.

4. A container according to claim 3, said side wall extending circumferentially about said bottom, said first bead extending circumferentially about said side wall, said fence extending circumferentially about said upper side wall portion, and said second bead extending circumferentially about said fence.

References Cited

UNITED STATES PATENTS

| 1,889,505 | 11/1932 | Wackman | 220—74 |
| 2,019,376 | 10/1935 | Wilhelm | 220—60 |
| 3,021,990 | 2/1962 | Duskey | 220—74 |

JOSEPH R. LECLAIR, Primary Examiner.

JAMES R. GARRETT, Asssistant Examiner.

U.S. Cl. X.R.

99—432; 229—3.5